UNITED STATES PATENT OFFICE.

VICTOR W. GRUMMAN, OF ZANESVILLE, OHIO.

METHOD OF MAKING ARTIFICIAL MARBLE.

1,200,489.     Specification of Letters Patent.     Patented Oct. 10, 1916.

No Drawing.     Application filed July 23, 1915. Serial No. 41,588.

*To all whom it may concern:*

Be it known that I, VICTOR W. GRUMMAN, a citizen of the United States, residing at Zanesville, in the county of Muskingum and State of Ohio, have invented certain new and useful Improvements in Methods of Making Artificial Marble, of which the following is a specification.

The present invention relates to the manufacture of artificial stone or marble and is itself a method of making this artificial marble.

Various endeavors have been made to simulate the grain of marble and this has been accomplished in various ways, principally by graining the exposed surface. However, when this exposed surface is chipped off or worn off, the grain is also removed and thus its resemblance to marble itself is removed.

My invention has for its main object a method whereby this graining may be continued through the entire thickness of the finished slab and in this manner no matter how much of the exposed surface is worn or chipped away, the grain will always appear.

In carrying forth my improved method, I resort to the use of a suitable cement as a base, this cement being of the desired color, preferably white. I have attained a high degree of success by using a cement made from stone quarried in England and known as Keenes stone. Another stone from which an exceedingly high grade of work can be done is that known as Caen stone and this latter being quarried in France. The cement made from these stones or any other suitable stone, is mixed with a suitable quantity of liquid, usually water, to form a plastic mass of the proper consistency. This mass is worked well with the water and then a small portion of it is formed into a thin layer. On the top surface of this layer I apply a suitable color or coloring agent usually in the form of what is known as oxid mineral colors. This color may be applied in various manners such as by mixing it with a small quantity of the plastic mass already described, to form a paste and this paste then spread in a thin film over the top surface of the plastic layer as related. On top of this layer and color, I then form another layer of the plastic mass and again apply a suitable film of color to its upper surface. This operation is repeated until a laminated mass of the height desired is produced. After having done this I employ a sharp tool of some type, whereby the laminated mass may be shredded. To do this, I cut the mass from the top side down to the bottom or, in other words, preferably at right angles to the top surface so that the various layers and color films will all be severed. The shred thus cut is then applied to the surface to be coated, and this is done in a manner so that one of the cut faces will appear as the exposed face on the covered surface. By this method, it will be noted that the films of color will run in the direction of thickness of the artificial slab and in this way the grain will occur throughout the entire thickness of the slab. These shreds are preferably cut approximately the thickness desired for the finished slab and the various shreds are placed side by side and worked to form a solid slab, causing the merging of all of the shreds into a homogeneous mass, and the desired blending of the colors into the base. In working the shreds to thus form a solid slab, it is customary to smooth over the exposed surface to make it as near flat as is possible. In doing this, the exposed grains formed by the color films are more or less smeared and the graining effect thus destroyed to a very marked extent. This destruction of the graining is not intentional, but is merely incidental to the proper working of the shreds. The slab thus formed is then permitted to set and when it has reached the proper hardness, the top surface of this slab is removed by scraping, planing or cutting as may be desired. In large areas, surfacing machines of a special design are usually employed. The essential feature is that this top surface of the finished slab should be removed to thereby remove the smeared surface and expose the more perfectly formed interior. This removal then brings the grain out in distinct form and if properly worked while the slab is being formed, presents a surface which cannot be distinguished from marble as far as its appearance is concerned. After the grain has thus been made to appear and the surface has been properly smoothed, it is usually customary to polish the same to give it a gloss as appears in the natural marble.

From the foregoing description, it will be apparent that any one using my method, may produce an artificial marble closely resembling the natural product.

Where I have spoken of forming the shredded mass into slabs, I do not necessarily mean detached slabs, as my method may be used in coating a floor or wall directly or slabs of a predetermined size made and subsequently applied to the surface they are intended to cover. My improved method may also be described as including three very essential steps, these steps being the formation of the laminated mass, the cutting of this laminated mass into shreds, the cuts being made at such angle that all of the layers and color films are passed through, and lastly, in applying these shreds to form the slab or coating in a manner so that one of the cut faces will appear as the exposed face or marble surface.

What I claim, is:

1. The method of making artificial marble which consists in mixing a cement base and a liquid to form a plastic mass of the proper consistency, forming said mass into superposed layers with the proper coloring material between layers, cutting the laminated mass into shreds and forming a slab of said shreds, the cuts being made at such angle to pass through the various layers of color films, the slab being made by turning the shreds so that one of their cut faces appear as the top face of the slab, smoothing or leveling the applied mass to solid and homogeneous slab form, permitting this applied mass to set and then removing the top portion to clearly expose the color veins.

2. The method of making artificial marble which consists in mixing a cement base and a liquid to form a plastic mass of the proper consistency, forming said mass into superimposed layers with the proper coloring material between layers, cutting the laminated mass into shreds, the cuts being made at such angle to pass through the various layers and color films, then applying the shreds while in a plastic state to the surface to be coated in a manner so that cut faces appear as the top face of the surface coated, smoothing or leveling the applied mass, permitting this applied mass to set, and then removing the top portion to clearly expose the color veins.

3. The method of making artificial marble which consists in mixing a cement base and a liquid to form a plastic mass of the proper consistency, forming a portion of said mass into a thin layer, applying a proper color medium to the top surface of said layer, forming another layer on top of said first named layer and color, applying another film of color to the top surface of said second named layer, these operations being continued until a proper height has been built up, cutting the laminated mass into shreds, the cuts being made at such angle to pass through the various layers and color films, then applying the shreds while in a plastic state to the surface to be coated in a manner so that cut faces appear as the top face of the surface coated, smoothing or leveling the applied mass, permitting this applied mass to set, and then removing the top portion to clearly expose the color veins.

In testimony whereof I affix my signature in presence of two witnesses.

VICTOR W. GRUMMAN.

Witnesses:
WALTER E. L. BOCK,
A. L. PHELPS.